(12) United States Patent
Teshima et al.

(10) Patent No.: US 8,231,999 B2
(45) Date of Patent: Jul. 31, 2012

(54) SEPARATOR AND BATTERY USING THE SAME

(75) Inventors: Yukako Teshima, Fukuoka (JP); Atsushi Kajita, Fukushima (JP); Hiroshi Imoto, Fukushima (JP)

(73) Assignee: Sony Corporation, Tokyo (JP)

(*) Notice: Subject to any disclaimer, the term of this patent is extended or adjusted under 35 U.S.C. 154(b) by 688 days.

(21) Appl. No.: 12/366,437

(22) Filed: Feb. 5, 2009

(65) Prior Publication Data

US 2009/0197159 A1  Aug. 6, 2009

(30) Foreign Application Priority Data

Feb. 6, 2008 (JP) .................................. 2008-026465

(51) Int. Cl.
*H01M 2/16* (2006.01)

(52) U.S. Cl. ...................................................... 429/145

(58) Field of Classification Search .................. 429/144, 429/145
See application file for complete search history.

(56) References Cited

U.S. PATENT DOCUMENTS

| | | | |
|---|---|---|---|
| 4,843,710 A * | 7/1989 | Schoales | 429/145 X |
| 6,207,316 B1 * | 3/2001 | Pauling | 429/144 X |
| 7,138,207 B2 * | 11/2006 | Yamaguchi et al. | 429/144 |
| 7,781,094 B2 * | 8/2010 | Yamada et al. | 429/145 |
| 2006/0141351 A1 * | 6/2006 | Suh | 429/144 |

FOREIGN PATENT DOCUMENTS

| | | |
|---|---|---|
| JP | 05-062662 | 3/1993 |
| JP | 10-006453 | 1/1998 |
| JP | 10-324758 | 12/1998 |
| JP | 2002-240215 | 8/2002 |
| JP | 2002-355938 | 12/2002 |
| JP | 2003-086162 | 3/2003 |
| JP | 2005-209570 | 8/2005 |
| JP | 2007-125821 | 5/2007 |
| JP | 2007-188777 | 7/2007 |
| WO | 2007/013179 A1 | 2/2007 |

OTHER PUBLICATIONS

Japanese Office Action issued Nov. 29, 2011, for corresponding Japanese Appln. No. 2009-026789.

* cited by examiner

*Primary Examiner* — Stephen J. Kalafut
(74) *Attorney, Agent, or Firm* — K&L Gates LLP

(57) ABSTRACT

A separator having at least: a base material layer made of a microporous membrane of a polyolefin resin; and a functional resin layer which is made of a resin different from the polyolefin resin and has a porous interconnected structure in which many holes are mutually interconnected. A diameter of a narrowest portion of through-holes of said functional resin layer is larger than a diameter of a narrowest portion of through-holes of said base material layer.

8 Claims, 5 Drawing Sheets

SEPARATOR AND BATTERY USING THE SAME

CROSS REFERENCES TO RELATED APPLICATIONS

The present application claims priority to Japanese Patent Application JP 2008-026465 filed in the Japanese Patent Office on Feb. 6, 2008, the entire contents of which is being incorporated herein by reference.

BACKGROUND

The present application relates to a separator and a battery using the separator and, more particularly, to a separator for insulating a cathode and an anode and a battery using the separator.

Owing to the remarkable development of the recent portable electronic techniques, cellular phones and notebook-sized computers have been recognized as fundamental techniques which support an advanced information society. Studies and development to realize advanced functions of those apparatuses have vigorously been being progressed. There is such a problem that a driving time is shortened by an increase in electric power consumption due to the realization of the advanced functions.

To keep the driving time of a predetermined standard time or longer, since it is an indispensable condition to realize a high energy density of a secondary battery which is used as a driving power source, for example, a lithium ion secondary battery is expected.

In the examination to realize a high capacity and a high safety of the lithium ion secondary battery, in the case of only a polyolefin microporous membrane in the related art, since it is difficult to obtain enough performance, it is necessary to apply a function to the polyolefin microporous membrane. As a method of applying the function to the polyolefin microporous membrane, for example, a method whereby the polyolefin microporous membrane is coated with a resin having difference properties or the like has been proposed.

For example, in Patent document 1 (JP-A-2002-355938), there has been disclosed such a technique that a composite film which is obtained by forming a coating layer made of a porous substance B of a heat resistant polymer onto at least one surface of a polyolefin microporous membrane A and is characterized in that a mean hole diameter of the porous substance B is larger than the maximum hole diameter of the polyolefin microporous membrane A is used as a separator for a battery such as a lithium secondary battery. According to the separator disclosed in Patent document 1, by using a Scanning Electron Microscope SEM, it is confirmed that the coating layer formed on the obtained composite film has a porous structure and the hole diameters are measured. The confirmation and measurement are performed by an observation only from an upper portion of the coating layer.

SUMMARY

However, even in the separator having large open holes in the surface, in the case where the inside has such a narrow structure that an ion passage deteriorates, since impregnating performance and an ion conductivity of an electrolytic solution are small, battery characteristics deteriorate.

It is, therefore, desirable to provide a separator in which sufficient impregnating performance of an electrolytic solution can be obtained and separator performance and battery characteristics can be improved without obstructing an ion conductivity and to provide a battery using the separator.

According to an embodiment, there is provided a separator comprising at least:

a base material layer made of a microporous membrane of a polyolefin resin; and a functional resin layer which is made of a resin different from the polyolefin resin and has a porous interconnected structure in which many holes are mutually interconnected, wherein a diameter of a narrowest portion of through-holes of the functional resin layer is larger than a diameter of a narrowest portion of through-holes of the base material layer.

According to another embodiment, there is provided a battery comprising a cathode, an anode, an electrolyte, and a separator, wherein the separator has at least a base material layer made of a microporous membrane of a polyolefin resin and a functional resin layer which is made of a resin different from the polyolefin resin and has a porous interconnected structure in which many holes are mutually interconnected, and a diameter of a narrowest portion of through-holes of the functional resin layer is larger than a diameter of a narrowest portion of through-holes of the base material layer.

According to an embodiment, the functional resin layer which is made of the resin different from the polyolefin resin and has the porous interconnected structure in which many holes are mutually interconnected is provided and the diameter of the narrowest portion of the through-holes of the functional resin layer is larger than the diameter of the narrowest portion of the through-holes of the base material layer. Therefore, the sufficient impregnating performance of an electrolytic solution can be obtained and separator performance and battery characteristics can be improved without obstructing an ion conductivity.

According to an embodiment, the sufficient impregnating performance of the electrolytic solution can be obtained and the separator performance and the battery characteristics can be improved without obstructing the ion conductivity.

Additional features and advantages are described herein, and will be apparent from the following Detailed Description and the figures.

DETAILED DESCRIPTION

Figure 1:
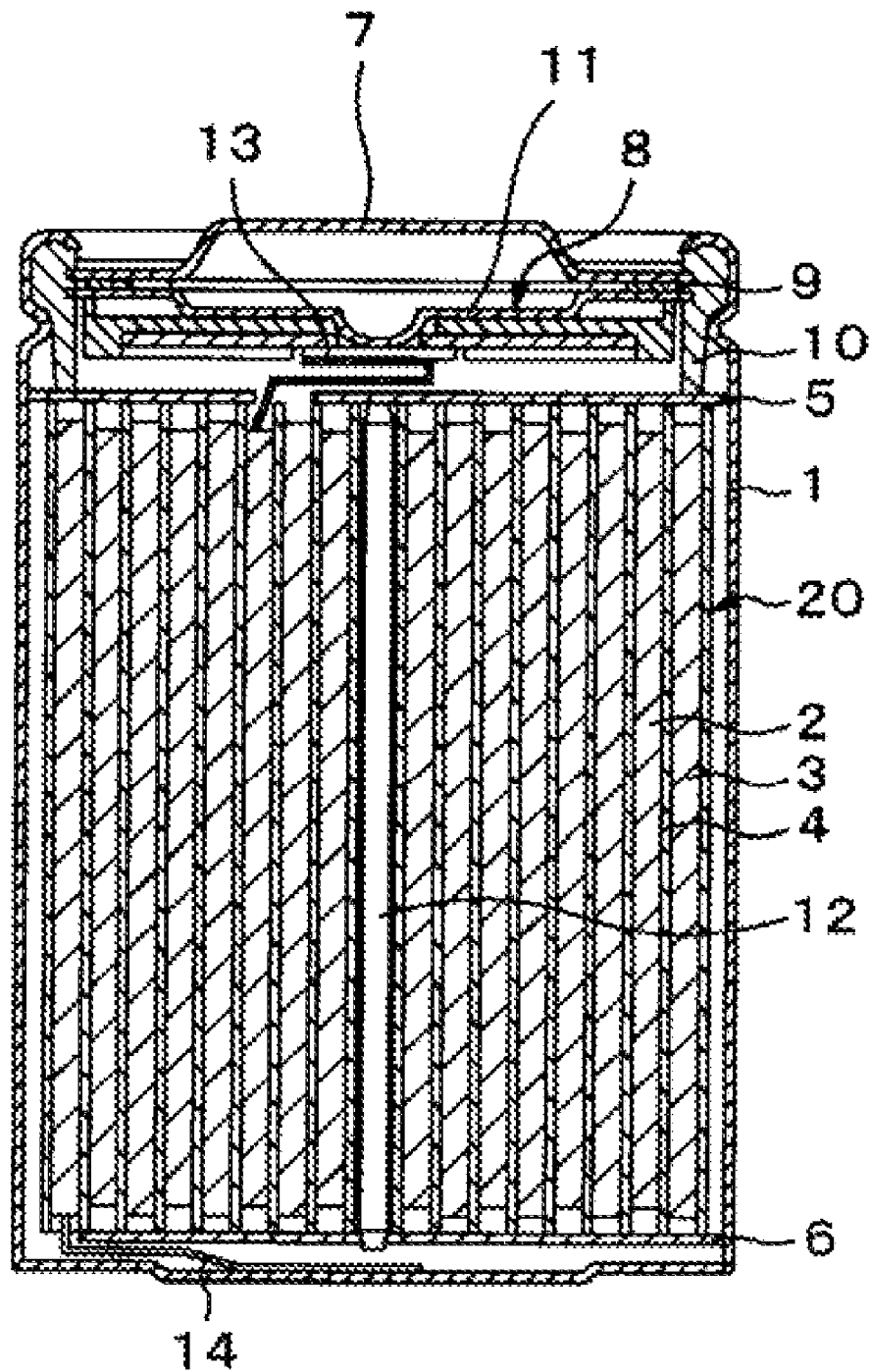
FIG. 1 is a cross sectional view illustrating a construction of a battery according to a first embodiment.

An embodiment will be described below with reference to the drawings. FIG. 1 illustrates a cross sectional structure of a non-aqueous electrolyte battery according to a first embodiment.

The non-aqueous electrolyte battery is what is called a cylindrical type and a winded electrode member 20 obtained by winding a belt-shaped cathode 2 and a belt-shaped anode 3 through a separator 4 is provided in an almost hollow cylindrical battery can 1.

The battery can 1 is made of, for example, iron Fe plated with nickel Ni, one end portion is closed, and the other end portion is opened. A pair of insulating plates 5 and 6 are arranged in the battery can 1 perpendicularly to a winded peripheral surface so as to sandwich the winded electrode member 20, respectively.

A battery cap 7 and a relief valve mechanism 8 and a thermally-sensitive resistive element (Positive Temperature Coefficient element: PCT element) 9 provided in the battery cap 7 are attached to an open end portion of the battery can 1 by being caulked through a gasket 10. The inside of the battery can 1 is sealed.

The battery cap 7 is made of, for example, a material similar to that of the battery can 1. The relief valve mechanism 8 is electrically connected to the battery cap 7 through the PTC element 9. When a pressure in the battery rises to a predetermined value or more by an internal short-circuit, heating from the outside, or the like, a disk plate 11 is reversed, thereby disconnecting the electrical connection between the battery cap 7 and the winded electrode member 20.

When a temperature rises, the PTC element 9 restricts a current by an increase in resistance value, thereby preventing an extraordinary heat generation due to the large current. The gasket 10 is made of, for example, an insulating material and its surface is coated with asphalt.

The winded electrode member 20 is wound around, for example, a center pin 12 as a center. A cathode lead 13 made of aluminum Al or the like is connected to the cathode 2 of the winded electrode member 20. An anode lead 14 made of nickel Ni or the like is connected to the anode 3. The cathode lead 13 is electrically connected to the battery cap 7 by being welded to the relief valve mechanism 8. The anode lead 14 is welded and electrically connected to the battery can 1.

[Cathode]

Figure 2:
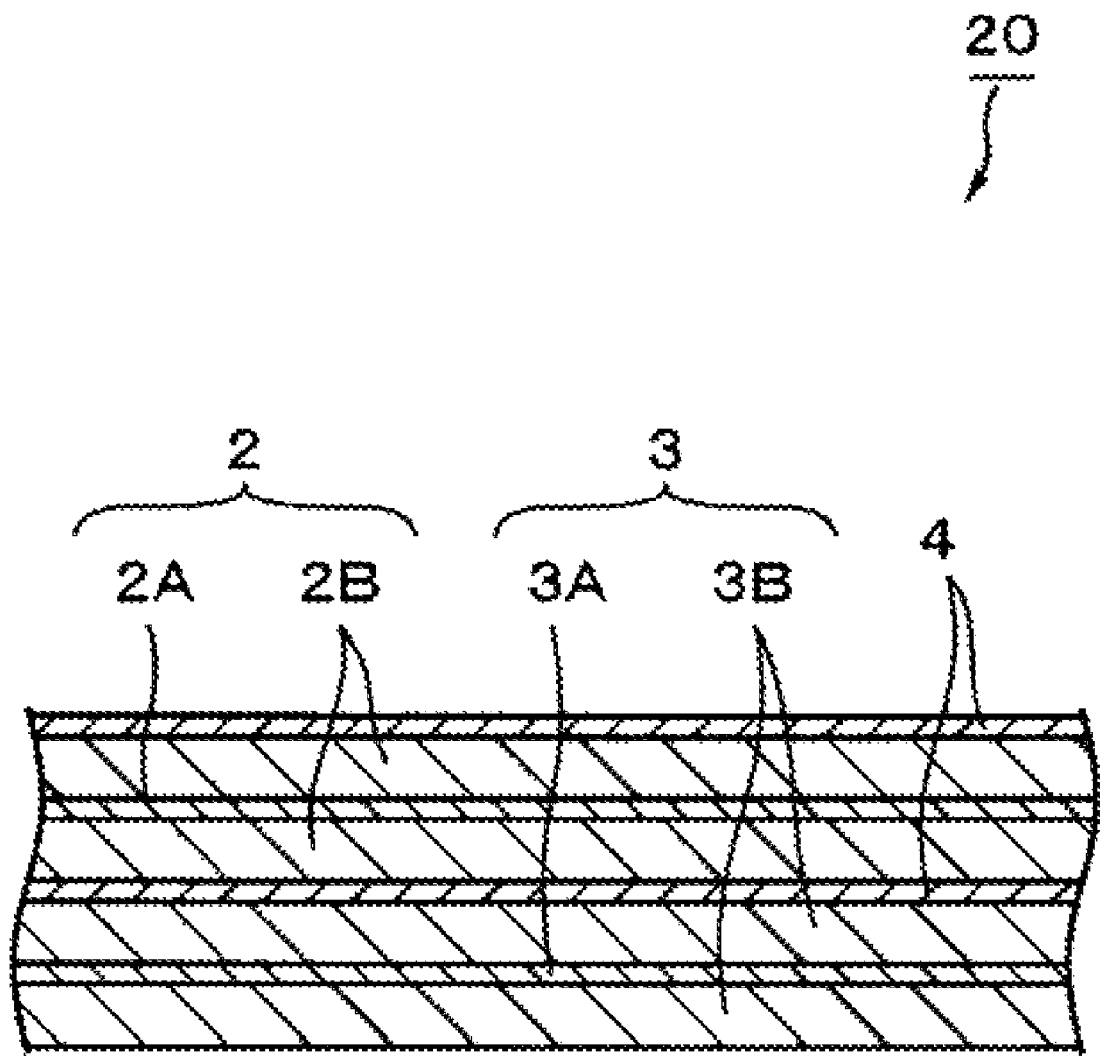
FIG. 2 is a cross sectional view enlargedly showing a part of a winded electrode member in the battery shown in FIG. 1.

FIG. 2 enlargedly shows a part of the winded electrode member 20 shown in FIG. 1. As shown in FIG. 2, the cathode 2 has, for example: a cathode collector 2A having a pair of opposite surfaces; and cathode mixture layers 2B formed on both surfaces of the cathode collector 2A. The cathode 2 may have a region in which the cathode mixture layer 2B is formed on only one surface of the cathode collector 2A. The cathode collector 2A is made of, for example, metal foil such as aluminum Al foil. The cathode mixture layer 2B contains, for example, a cathode active material and may contain a conductive material such as graphite and a binder such as polyvinylidene fluoride as necessary.

As a cathode active material, a cathode material which can dope and dedope lithium can be used. Specifically speaking, as a cathode material, for example, a lithium oxide, a lithium phosphorus oxide, a lithium sulfide, or a lithium-contained compound such as an interlayer compound containing lithium is proper and two or more kinds of them may be mixed and used. In order to raise an energy density, the lithium-contained compound containing lithium Li, a transition metal element, and oxygen O is preferable. Among them, it is much preferable that the lithium-contained compound contains at least one kind of elements in a group including cobalt Co, nickel Ni, manganese Mn, and iron Fe as a transition metal element.

As such a lithium-contained compound, for example, a lithium composite oxide having mean compositions expressed by Formula I, more specifically speaking, Formula II and a lithium composite oxide having mean compositions expressed by Formula III can be mentioned.

$$Li_pNi_{(1-q-r)}Mn_qM1_rO_{(2-y)}X_z \quad \text{(Formula I)}$$

(In the formula, M1 denotes at least one kind of elements selected from Group 2 to Group 15 excluding nickel Ni and manganese Mn; X denotes at least one kind of elements in Group 16 and Group 17 excluding oxygen O; and p, q, r, y, and z denote values within ranges of $0 \leq p \leq 1.5$, $0 \leq q \leq 1.0$, $0 \leq r \leq 1.0$, $-0.10 \leq y \leq 0.20$ and $0 \leq z \leq 0.2$, respectively. Compositions of lithium differ depending on a charge/discharge state and the value of p indicates a value in a perfect discharging state).

$$Li_aCo_{1-b}M2_bO_{2-c} \quad \text{(Formula II)}$$

In the formula, M2 denotes at least one kind of elements in a group including vanadium V, copper Cu, zirconium Zr, zinc Zn, magnesium Mg, aluminum Al, gallium Ga, yttrium Y, and iron Fe; and a, b, and c denote values within ranges of $0.9 \leq a \leq 1.1$, $0 \leq b \leq 0.3$, and $-0.1 \leq c \leq 0.1$, respectively. Compositions of lithium differ depending on the charge/discharge state and the value of a indicates a value in the perfect discharging state.

$$Li_wNi_xCo_yMn_zM3_{1-x-y-z}O_{2-v} \quad \text{(Formula III)}$$

In the formula, M3 denotes at least one kind of elements in a group including vanadium V, copper Cu, zirconium Zr, zinc Zn, magnesium Mg, aluminum Al, gallium Ga, yttrium Y, and iron Fe; and v, w, x, y, and z denote values within ranges of $-0.1 \leq v \leq 0.1$, $0.9 \leq w \leq 1.1$, $0 < x < 1$, $0 < y < 1$, $0 < z < 0.5$, and $0 \leq 1-x-y-z$, respectively. Compositions of lithium differ depending on the charge/discharge state and the value of w indicates a value in the perfect discharging state.

Further, as a lithium-contained compound, for example, a lithium composite oxide having a spinel type structure expressed by Formula IV, more specifically speaking, $Li_dMn_2O_4$ ($d \approx 1$) or the like can be mentioned.

$$Li_pMn_{2-q}M4_qO_rF_s \quad \text{(Formula IV)}$$

In the formula, M4 denotes at least one kind of elements in a group including cobalt Co, nickel Ni, magnesium Mg, aluminum Al, boron B, titanium Ti, vanadium V, chromium Cr, iron Fe, copper Cu, zinc Zn, molybdenum Mo, tin Sn, calcium Ca, strontium Sr, and tungsten W; and p, q, r, and s denote values within ranges of $0.9 \leq p \leq 1.1$, $0 \leq q \leq 0.6$, $3.7 \leq r \leq 4.1$, and $0 \leq s \leq 0.1$, respectively. Compositions of lithium differ depending on the charge/discharge state and the value of p indicates a value in the perfect discharging state.

Further, as a lithium-contained compound, for example, a lithium composite phosphate having an olivin type structure expressed by Formula V, more specifically speaking, Formula VI, or the like can be mentioned. Further specifically speaking, $Li_eFePO_4$ ($e \approx 1$) or the like can be mentioned.

$$Li_aM5_bPO_4 \quad \text{(Formula V)}$$

In the formula, M5 denotes at least one kind of elements selected from Group 2 to Group 15; and a and b denote values within ranges of $0 \leq a \leq 2.0$ and $0.5 \leq b \leq 2.0$, respectively. Compositions of lithium differ depending on the charge/discharge state and the value of a indicates a value in the perfect discharging state.

$$Li_tM6PO_4 \quad \text{(Formula VI)}$$

In the formula, M6 denotes at least one kind of elements in a group including cobalt Co, manganese Mn, iron Fe, nickel Ni, magnesium Mg, aluminum Al, boron B, titanium Ti, vanadium V, niobium Nb, copper Cu, zinc Zn, molybdenum Mo, calcium Ca, strontium Sr, tungsten W, and zirconium Zr;

and t denotes a value within a range of $0.9 \leq t \leq 1.1$. Compositions of lithium differ depending on the charge/discharge state and the value of t indicates a value in the perfect discharging state.

Besides the cathode materials mentioned above, as a cathode material which can dope and dedope lithium Li, an inorganic compound such as $MnO_2$, $V_2O_5$, $V_6O_{13}$, NiS, or MoS which does not contain lithium can be mentioned.

[Anode]

The anode 3 has a structure in which, for example, anode mixture layers 3B are formed on both surfaces of the anode collector 3A having a pair of opposite surfaces. Although not shown, the anode mixture layer 3B may be formed on only one surface of the anode collector 3A. The anode collector 3A is made of, for example, metal foil such as copper foil.

The anode mixture layer 3B is formed by containing one kind or two or more kinds of anode materials which can dope and dedope lithium as an anode active material and is formed by containing a binder similar to the cathode mixture layer 2B as necessary.

In the non-aqueous electrolyte battery, an electrochemical equivalent of the anode material which can dope and dedope lithium is larger than that of the cathode 2, thereby preventing a lithium metal from being precipitated in the anode 3 during the charging.

The non-aqueous electrolyte battery is designed so that an open circuit voltage (that is, battery voltage) in a full charging state lies within a range, for example, from 4.2V or more to 4.6V or less. For example, when the open circuit voltage in the full charging state is equal to 4.25V or more, even in the case of the same cathode active material, a dedoping amount of lithium per unit mass is larger than that of a battery of 4.2V. Therefore, amounts of the cathode active material and the anode active material are adjusted according to the dedoping amount so as to obtain the high energy density.

As an anode material which can dope and dedope lithium, for example, a carbon material such as graphite, non-easy-graphitizable carbon, easy-graphitizable carbon, pyrolytic carbon class, coke class, glassy carbon class, organic high molecular compound baked material, carbon fiber, or activated charcoal can be mentioned.

Among them, there is a pitch coke, a needle coke, a petroleum coke, or the like as a coke class. The organic high molecular compound baked material denotes a material obtained by baking a high molecular material such as phenol resin or fran resin at a proper temperature so as to be carbonized. There is also an organic high molecular compound baked material which is partially classified into non-easy-graphitizable carbon or easy-graphitizable carbon. As a high molecular material, there is polyacetylene, polypyrrole, or the like.

Those carbon materials are preferable because a change in crystal structure that is caused upon charging/discharging is very small, a high charge/discharge capacitance can be obtained, and good cycle characteristics can be obtained. Particularly, the graphite is preferable because an electrochemical equivalent is large and the high energy density can be obtained. Non-easy graphitizable carbon is preferable because excellent characteristics can be obtained. Moreover, a carbon material in which a charge/discharge potential is low, specifically speaking a carbon material in which, the charge/discharge potential is close to that of the lithium metal is preferable because the high energy density of the battery can be easily realized.

As an anode material which can dope and dedope lithium, a material which can dope and dedope lithium and which contains at least one kind of metal elements and semimetal elements as a component element can be also mentioned. This is because if such a material is used, the high energy density can be obtained. Particularly, if it is used together with a carbon material, since not only the high energy density can be obtained but also the excellent cycle characteristics can be obtained, it is much preferable. The anode material may be a simple substance, an alloy, or a compound of the metal elements or semimetal elements or may be a material having one kind or two or more kinds of phases of them in at least a part may be used. In the present application, in addition to an alloy consisting of two or more kinds of metal elements, an alloy consisting of one or more kinds of metal elements and one or more kinds of semimetal elements is also incorporated in the alloys. The material may contain a non-metal element. As a texture, there is a solid solution, an eutectic (eutectic mixture), an intermetallic compound, or a texture in which two or more kinds of them coexist.

As a metal element or a semimetal element constructing the anode material, for example, there can be mentioned: magnesium Mg; boron B; aluminum Al; gallium Ga; indium In; silicon Si; germanium Ge; tin Sn; lead Pb; bismuth Bi; cadmium Cd; silver Ag; zinc Zn; hafnium Hf; zirconium Zr; yttrium Y; palladium Pd; or platinum Pt. They may be crystalline or amorphous elements.

Among them, as an anode material, an anode material containing a metal element or a semimetal element of Group 4B in a short period type periodic table as a component element is preferable. An anode material containing at least one of silicon Si and tin Sn as a component element is particularly preferable. This is because according to silicon Si and tin Sn, an ability of doping and dedoping lithium Li is large and the high energy density can be obtained.

As an alloy of tin Sn, for example, an alloy containing at least one kind in a group including silicon Si, nickel Ni, copper Cu, iron Fe, cobalt Co, manganese Mn, zinc Zn, indium In, silver Ag, titanium Ti, germanium Ge, bismuth Bi, antimony Sb, and chromium Cr as a second component element other than tin Sn can be mentioned. As an alloy of silicon Si, for example, an alloy containing at least one kind in a group including tin Sn, nickel Ni, copper Cu, iron Fe, cobalt Co, manganese Mn, zinc Zn, indium In, silver Ag, titanium Ti, germanium Ge, bismuth Bi, antimony Sb, and chromium Cr as a second component element other than silicon Si can be mentioned.

As a compound of tin Sn or a compound of silicon Si, for example, a compound containing oxygen O or carbon C can be mentioned. In addition to tin Sn or silicon Si, the foregoing second component element may be contained.

As an anode material which can dope and dedope lithium, further, another metal compound or a high molecular material can be mentioned. As another metal compound, an oxide such as $MnO_2$, $V_2O_5$, or $V_6O_{13}$, a sulfide such as NiS, or MoS, or a lithium nitride such as $LiN_3$ can be mentioned. As a high molecular material, polyacetylene, polyaniline, polypyrrole, or the like can be mentioned.

[Electrolytic Solution]

As an electrolytic solution, a non-aqueous electrolytic solution obtained by dissolving electrolytic salt into a non-aqueous solvent can be used. As a non-aqueous solvent, for example, it is preferable to contain at least one of ethylene carbonate and propylene carbonate. This is because the cycle characteristics can be improved. Particularly, if the non-aqueous solvent mixedly contains ethylene carbonate and propylene carbonate, it is preferable because the cycle characteristics can be further improved. As a non-aqueous solvent, it is preferable to contain at least one kind of chain-like carbonic esters such as diethyl carbonate, dimethyl carbonate, ethylmethyl carbonate, methylpropyl carbonate, and the like. This is because the cycle characteristics can be further improved.

As a non-aqueous solvent, it is further preferable to contain at least one of 2,4-difluoroanisole and vinylene carbonate. This is because in the case of 2,4-difluoroanisole, the discharge capacitance can be improved and, in the case of vinylene carbonate, the cycle characteristics can be further improved. Particularly, if the non-aqueous solvent mixedly contains them, it is much preferable because both of the discharge capacitance and the cycle characteristics can be improved.

As a non-aqueous solvent, it may further contain one kind or two or more kinds of butylene carbonate, γ-butyrolactone, γ-valerolactone, a material obtained by substituting a fluorine radical for a part or all of a hydrogen radical of those compounds, 1,2-dimethoxy ethane, tetrahydrofuran, 2-methyl tetrahydrofuran, 1,3-dioxorane, 4-methyl-1,3-dioxorane, methyl acetate, methyl propionate, acetonitrile, glutaronitrile, adiponitrile, methoxy acetonitrile, 3-methoxy propylonitrile, N,N-dimethyl formamide, N-methyl pyrrolidinone, N-methyl oxazolidinone, N,N-dimethyl imidazolidinone, nitromethane, nitroethane, sulfolan, dimethyl sulfoxide, trimethyl phosphate, and the like.

In dependence on electrodes which are combined, there is a case where reversibility of an electrode reaction is improved by using a material obtained by substituting a fluorine atom for a part or all of a hydrogen atom of a substance contained in the above non-aqueous solvent group. Therefore, those substances can be also properly used.

As lithium salt as electrolytic salt, for example, $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, $LiCl$, $LiBF_2(ox)$ [lithium difluoro [oxalato-O,O']borate], LiBOB [lithium bis [oxalato-O,O']borate], or LiBr is proper. Any one kind or two or more kinds of them can be mixedly used. Among them, $LiPF_6$ is preferable because the high ion conductivity can be obtained and the cycle characteristics can be improved.

[Separator]

Figure 3:
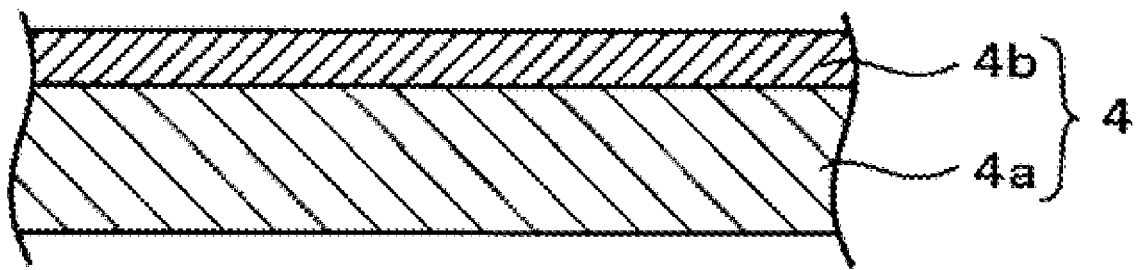
FIG. 3 is an enlarged cross sectional view of an example of a separator of the battery according to a first embodiment.

The separator 4 isolates the cathode 2 and the anode 3 and allows lithium ions to pass while preventing a short-circuit of a current that is caused by a contact of both of them. As shown in FIG. 3, the separator 4 is formed by a base material layer 4a and a functional resin layer 4b.

The base material layer 4a is made of a microporous membrane of a polyolefin resin. As a polyolefin resin, polyethylene PE, polypropylene PP, a mixture of those polyolefin resins, or the like can be used. The polyolefin resin has a shutdown function for shutting down the current by clogging the open holes at a temperature near a melting point.

The functional resin layer 4b is made of a resin different from the polyolefin resin and has a porous interconnected structure in which many holes are mutually interconnected. As for the functional resin layer 4b, in the case where the functional resin layer 4b and the base material layer 4a are measured by a bubble point method, a half-drying method and method with darcy principle by using perm-porometer (CFP-1500A by Seika Corporation) and a Liquid Extrusion Porosimeter (LEP-200-A manufactured by Seika Corporation), a diameter of the narrowest portion of the through-holes of the functional resin layer 4b is larger than a diameter of the narrowest portion of the through-holes of the base material layer 4a. The functional resin layer 4b having such a structure has excellent impregnating performance and ion conductivity of the electrolytic solution.

If the diameter of the narrowest portion of the through-holes of the functional resin layer 4b is smaller than that of the base material layer 4a, such a portion becomes a bottleneck for ion conductivity, the ion conductivity deteriorates more than that of a separator formed only by the base material, and particularly, battery characteristics such as cycle characteristics deteriorate. Therefore, the function as a separator is deteriorated. However, if the diameter of the narrowest portion of the through-holes of the functional resin layer is larger than that of the base material, the function of the functional resin layer 4b can be effected without deteriorating the ion conductivity of the base material layer 4a. Therefore, it is necessary that the diameter of the narrowest portion of the through-holes of the functional resin layer 4b is larger than the diameter of the narrowest portion of the through-holes of the base material layer 4a.

The functional resin layer 4b can be formed by, for example, a method whereby by using a desk-top coater or the like, the base material layer 4a is coated with a solution obtained by dissolving a resin into a solvent such as N-methyl-2-pyrrolidone NMP and, subsequently, the solution is phase-separated in a poor solvent such as water and, thereafter, is dried by hot air or the like.

As a resin forming the functional resin layer 4b, a heat resistant resin, a fluororesin, or the like can be used. The heat resistant resin denotes, in the case of a non-crystalline resin, a resin whose glass transition temperature is equal to 200° C. or higher. In the case of a crystalline resin, it denotes a resin whose glass transition temperature is equal to 200° C. or higher and having a melting point of 250° C. or higher or having no melting point.

As a heat resistant resin, a resin whose glass transition temperature is as high as possible is preferable from a viewpoint of dimensional stability under a high temperature atmosphere. A resin which has a melting entropy and does not have the melting point is preferable from such a viewpoint that a dimensional change or a contraction due to a flow can be reduced. As such a resin, specifically speaking, for example, polyphenylene sulfide, polysulfone, polyether sulfone, polyether etherketone, polyarylate, polyetherimide, polyamide-imide, polyimide, or the like can be mentioned.

In the case of using the heat resistant resin as a resin forming the functional resin layer 4b, an area heat contraction ratio at a high temperature can be reduced. For example, when the area heat contraction ratio of the separator 4 is equal to 60% or less at 200° C., the safety of the battery can be remarkably improved.

Polyvinylidene fluoride, polytetrafluoro ethylene, or the like can be used as a fluororesin. In the case of using the fluororesin as a resin forming the functional resin layer 4b, the electrochemical stability, the impregnating performance of the electrolytic solution, the holdability of the electrolytic solution, the flexibility, and the like can be improved.

In the separator 4, it is preferable that all of the diameters of the through-holes of the functional resin layers 4b which are obtained in the case of measuring by the bubble point method and the half-drying method by using the Liquid Extrusion Porosimeter (LEP-200-A manufactured by Seika Corporation) lie within a range from 0.015 μm or more to 20 μm or less and the number of through-holes (of the functional resin layers 4b) whose diameters lie within a range from 0.02 μm or more to 10 μm or less is equal to 50% or more in the whole number of through-holes.

When functional resin layer 4b has a through-hole with diameter of less than 0.015 μm, ion permeability is remarkably disturbed and cell properties like cyclistic porpertie is degradated. When functional resin layer 4b has a through-hole with diameter of more than 20 μm, apparent density of the layer 4b is so low that the mechanical strength become too degradated.

When the through-holes with diameters of 0.02 μm or more and 10 μm or less is less than 50% of the whole through-holes, these degradations are easily brought about.

For example, even in a structure in which the open holes in the surface is large, in the case of a structure in which the inside is so narrow that the ion passage deteriorates, the battery characteristics deteriorate. Therefore, as an evaluation index of the porosity, it is important to know the internal structure (narrowest hole portion) instead of the open holes in the surface layer. When the diameter of the through-holes lies within the foregoing numerical value range, the more excellent battery characteristics can be obtained.

It is preferable that a piercing strength of the separator 4 lies within a range from 100 gf or more to 1000 gf or less. This is because if the piercing strength is small, there is a case where a short-circuit occurs, and if it is large, the ion conductivity deteriorates.

It is preferable that air permeability of the separator 4 lies within a range from 30 sec/100 cc or more to 1000 sec/100 cc or less. This is because if the air permeability is small, there is a case where a short-circuit occurs, and if it is large, the ion conductivity deteriorates.

The separator 4 is not limited to the separator having a double-layered structure of the base material layer 4a and the functional resin layer 4b mentioned above but may have a structure of three or more layers so long as it has the base material layer 4a and the functional resin layer 4b.

The functional resin layer 4b may contain an inorganic filler. By allowing the inorganic filler to be contained in the functional resin layer 4b, an oxidation resistance of the separator can be improved and a heat conduction and a heat sink effect which the inorganic filler has can be also improved.

Further, as a resin forming the functional resin layer 4b, a resin obtained by mixing two or more kinds of resins may be used. Further, the resin forming the functional resin layer 4b is not limited to the heat resistant resin or the fluororesin but an arbitrary resin may be used so long as it is a resin which can improve the performance of the separator and the battery characteristics.

Subsequently, a manufacturing method of the non-aqueous electrolyte battery according to the first embodiment will be described. Hereinbelow, a cylindrical non-aqueous electrolyte battery is mentioned as an example and the manufacturing method of the non-aqueous electrolyte battery will be described.

The cathode 2 is manufactured as follows. First, for example, a cathode mixture is adjusted by mixing a cathode active material, a conductive material, and a binder. The cathode mixture is dispersed into a solvent such as N-methyl-2-pyrrolidone, thereby forming a cathode mixture slurry.

Subsequently, the cathode collector 2A is coated with the cathode mixture slurry, the solvent is dried, and thereafter, the cathode collector is compression-molded by a roll pressing machine or the like, thereby forming the cathode mixture layer 2B and manufacturing the cathode 2.

The anode 3 is manufactured as follows. First, for example, an anode mixture is adjusted by mixing an anode active material and a binder. The anode mixture is dispersed into a solvent such as N-methyl-2-pyrrolidone, thereby forming an anode mixture slurry.

Subsequently, the anode collector 3A is coated with the anode mixture slurry, the solvent is dried, and thereafter, the anode collector is compression-molded by the roll pressing machine or the like, thereby forming the anode mixture layer 3B and manufacturing the anode 3.

Subsequently, the cathode lead 13 is attached to the cathode collector 2A by welding or the like and the anode lead 14 is attached to the anode collector 3A by welding or the like. Subsequently, the cathode 2 and the anode 3 are wound through the separator 4. A front edge portion of the cathode lead 13 is welded to the relief valve mechanism 8. A front edge portion of the anode lead 14 is welded to the battery can 1. The wound cathode 2 and anode 3 are sandwiched between the pair of insulating plates 5 and 6 and enclosed in the battery can 1.

Subsequently, an electrolytic solution is injected into the battery can 1. The electrolytic solution is impregnated into the separator 4. Subsequently, the battery cap 7, relief valve mechanism 8, and PCT element 9 are fixed to the open end portion of the battery can 1 by being caulked through the gasket 10. In this manner, the non-aqueous electrolyte battery according to the first embodiment is manufactured.

In the non-aqueous electrolyte battery according to the first embodiment, when a charge is executed, for example, lithium ions are dedoped from the cathode 2 and doped into the anode 3 through the electrolytic solution. When a discharge is executed, for example, the lithium ions are dedoped from the anode 3 and doped into the cathode 2 through the electrolytic solution.

Figure 4:
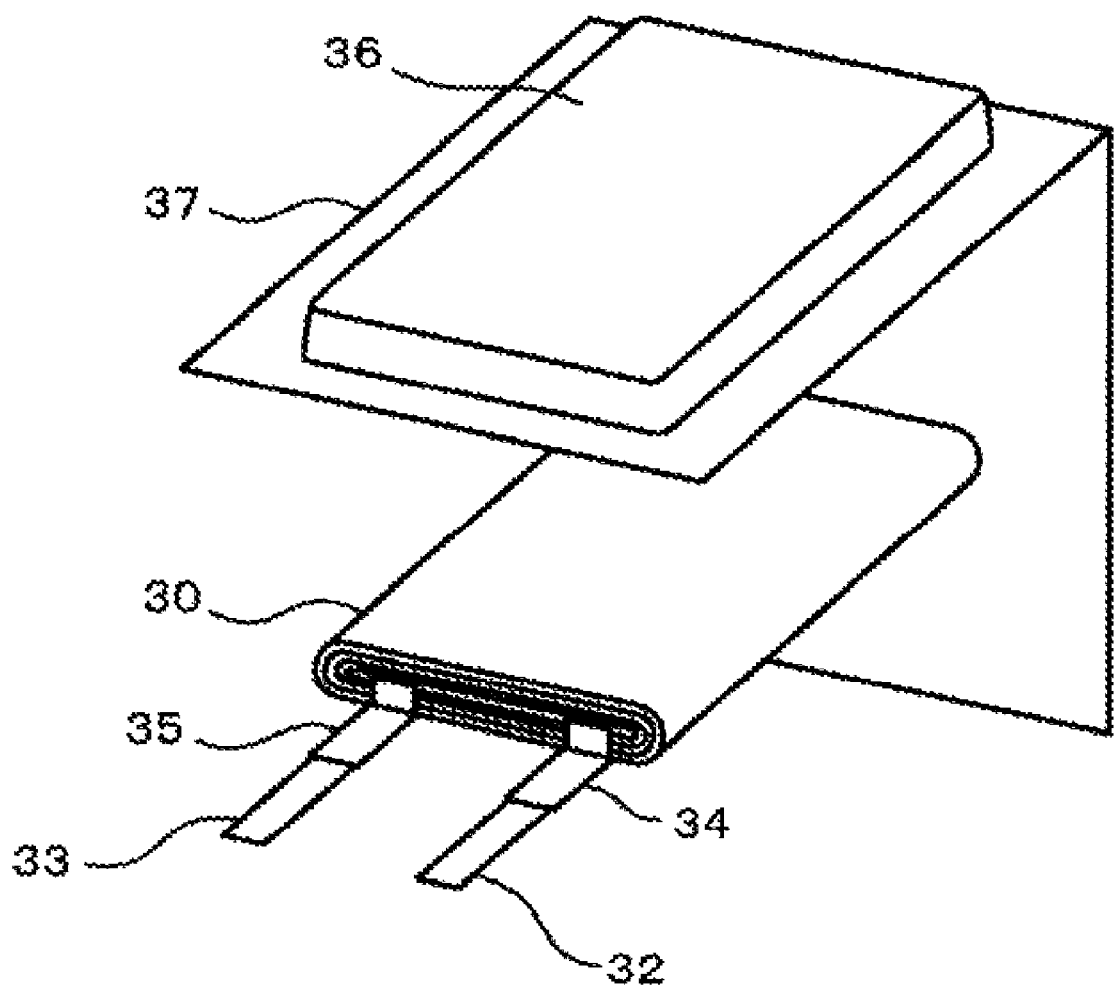
FIG. 4 is a cross sectional view illustrating a construction of a battery according to a second embodiment.

The second embodiment will be described. FIG. 4 illustrates a structure of a non-aqueous electrolyte battery according to the second embodiment. As shown in FIG. 4, the non-aqueous electrolyte battery is formed by enclosing a battery element 30 into a sheathing member 37 made of a moisture-proof laminate film and sealing the sheathing member 37 by melt-bonding the circumference of the battery element 30. A cathode lead 32 and an anode lead 33 are provided for the battery element 30 and those leads are sandwiched between the sheathing members 37 and led out to the outside. Both surfaces of the cathode lead 32 are coated with resin members 34 and both surfaces of the anode lead 33 are also coated with resin members 35 in order to improve an adhesion with the sheathing member 37, respectively.

[Sheathing Member]

The sheathing member 37 has a laminate structure in which, for example, an adhesive layer, a metal layer, and a surface protecting layer are sequentially laminated. The adhesive layer is made of a high molecular film. As a material forming the high molecular film, for example, polypropylene PP, polyethylene PE, casted polypropylene CPP, linear low-density polyethylene LLDPE, or low-density polyethylene LDPE can be mentioned. The metal layer is made of metal foil. As a material forming the metal foil, for example, aluminum Al can be mentioned. As a material forming the metal foil, a metal other than aluminum can be also used. As a material forming the surface protecting layer, for example, nylon Ny or polyethylene terephthalate PET can be mentioned. The surface on the adhesive layer side becomes an enclosing surface on the side where the battery element 30 is enclosed.

[Battery Element]

Figure 5:
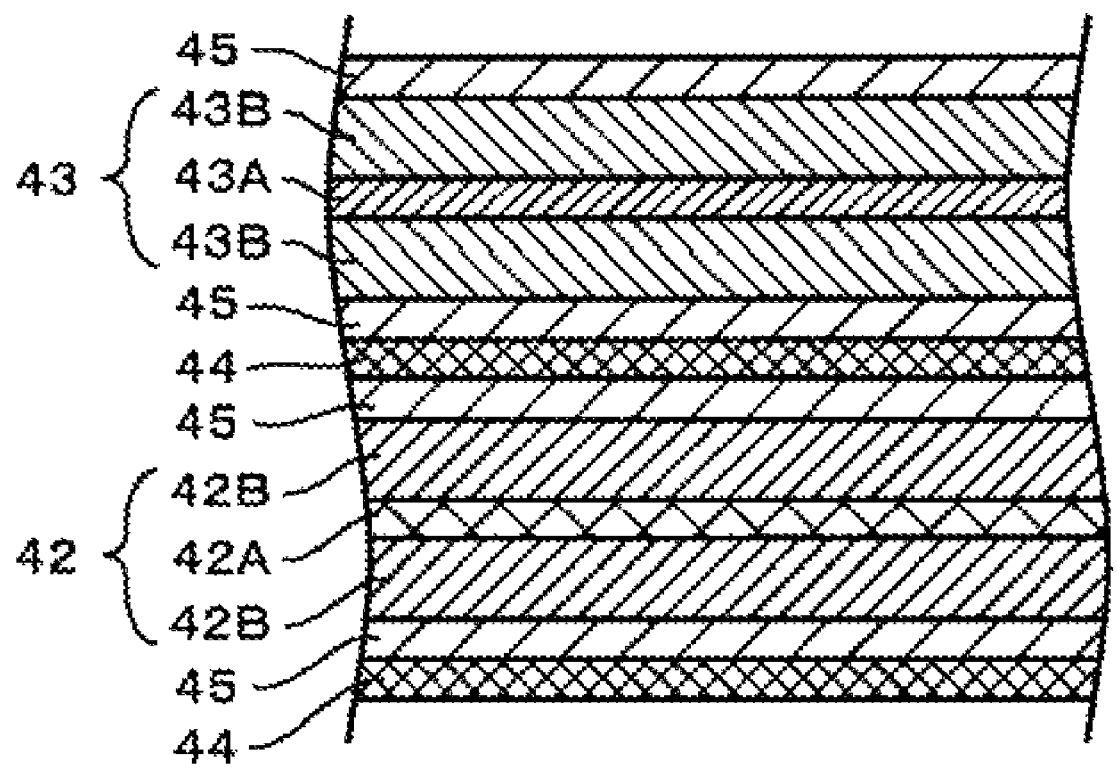
FIG. 5 is a cross sectional view of a winded electrode member shown in FIG. 4.

For example, as shown in FIG. 5, the battery element 30 is a winding type battery element 30 formed in such a manner that a belt-shaped anode 43 having gel electrolyte layers 45 on both surfaces, a separator 44, a belt-shaped cathode 42 having the gel electrolyte layers 45 on both surfaces, and the separator 44 are laminated and this laminate body is wound in the longitudinal direction. A detailed description of a structure of the separator 44 and the like is omitted here because it is similar to that in the first embodiment.

The cathode 42 has: a belt-shaped cathode collector 42A; and cathode mixture layers 42B formed on both surfaces of the cathode collector 42A. The cathode collector 42A is, for example, metal foil made of aluminum Al or the like.

The cathode lead 32 connected by, for example, a spot welding or an ultrasonic welding is attached to one end portion in the longitudinal direction of the cathode 42. As a material of the cathode lead 32, for example, a metal such as aluminum or the like can be used.

The anode 43 has: a belt-shaped anode collector 43A; and anode mixture layers 43B formed on both surfaces of the anode collector 43A. The anode collector 43A is made of, for example, metal foil such as copper Cu foil, nickel foil, or stainless foil.

The anode lead 33 connected by, for example, the spot welding or ultrasonic welding is also attached to one end portion in the longitudinal direction of the anode 43 in a manner similar to the cathode 42. As a material of the anode lead 33, for example, copper Cu, nickel Ni, or the like can be used.

Since a construction other than the gel electrolyte layer 45 is similar to that in the foregoing first embodiment, the gel electrolyte layer 45 will be described hereinbelow.

The gel electrolyte layer 45 contains an electrolytic solution and a high molecular compound serving as a holding member for holding the electrolytic solution and is in what is called a gel-state. The gel electrolyte layer 45 is preferable because the high ion conductivity can be obtained and a leakage of the battery can be prevented. A construction of the electrolytic solution (that is, a liquid solvent, electrolytic salt, and an additive) is similar to that in the first embodiment.

As a high molecular compound, for example, there can be mentioned: polyacrylonitrile; polyvinylidene fluoride; a copolymer of vinylidene fluoride and hexafluoro propylene; polytetrafluoro ethylene; polyhexafluoro propylene; polyethylene oxide; polypropylene oxide; polyphosphazene; polysiloxane; polyvinyl acetate; polyvinyl alcohol; polymethyl methacrylate; polyacrylic acid; polymethacrylate; styrene-butadiene rubber; nitrile-butadiene rubber; polystyrene; or polycarbonate. Particularly, polyacrylonitrile, polyvinylidene fluoride, polyhexafluoro propylene, or polyethylene oxide is preferable from a viewpoint of electrochemical stability.

Subsequently, a manufacturing method of the non-aqueous electrolyte battery according to the second embodiment will be described. First, each of the cathode 42 and the anode 43 is coated with a precursor solution containing a solvent, electrolytic salt, a high molecular compound, and a mixed solvent and the mixed solvent is evaporated, thereby forming the gel electrolyte layer 45. The cathode lead 32 is previously attached to an end portion of the cathode collector 42A by welding and the anode lead 33 is also previously attached to an end portion of the anode collector 43A by welding.

Subsequently, the cathode 42 and the anode 43 on which the gel electrolyte layers 45 have been formed, respectively, are laminated through the separator 44, thereby forming a laminate body. After that, the laminate body is wound in its longitudinal direction, thereby forming the winding type battery element 30.

Subsequently, a concave portion 36 is formed by deep-drawing the sheathing member 37 made of the laminate film. The battery element 30 is inserted into the concave portion 36. A non-treated portion of the sheathing member 37 is folded back to an upper portion of the concave portion 36 and an outer peripheral portion of the concave portion 36 is thermally melt-bonded, thereby sealing. In this manner, the non-aqueous electrolyte battery according to the second embodiment is manufactured.

EXAMPLES

Specific Examples of the present application will be described in detail. However, the present application is not limited only to those Examples.

Example 1

By the desk-top coater, the polyethylene microporous membrane is coated with the solution obtained by dissolving 7 wt % of aramid resin into N-methyl-pyrrolidone. The membrane is dipped into a water bath and phase-separated, and thereafter, dried by the hot air, thereby forming a functional resin layer which is made of the aramid resin and whose area density is equal to 0.20 mg/cm$^2$ and manufacturing a separator of Example 1.

The polyethylene microporous membrane is obtained by the following method. Polyethylene resin and plasticizer are mixed and extruded, which is biaxially stretched to be a thin film. Then plasticizer is falled out from the thin film, which becomes microporous. But the method is one of the example and polyethylene microporous membrane obtained by other methods can be adapted to the separator.

Example 2

A separator of Example 2 is manufactured in a manner similar to Example 1 except a point that the concentration of the aramid resin in the aramid solution is adjusted and the diameters of the through-holes of the functional resin layer are changed. As for the concentration of the resin solution, the higher the concentration is, the smaller the diameter is, and the lower the concentration is, the larger the diameter is.

Example 3

A separator of Example 3 is manufactured in a manner similar to Example 1 except a point that the concentration of the aramid resin in the aramid solution is adjusted and the diameters of the through-holes of the functional resin layer are changed.

Example 4

A separator of Example 4 is manufactured in a manner similar to Example 1 except a point that the concentration of the aramid resin in the aramid solution is adjusted and the diameters of the through-holes of the functional resin layer are changed.

Example 5

A separator of Example 5 is manufactured in a manner similar to Example 1 except a point that the concentration of the aramid resin in the aramid solution is adjusted and the diameters of the through-holes of the functional resin layer are changed.

Example 6

A separator of Example 6 is manufactured in a manner similar to Example 1 except a point that the concentration of the aramid resin in the aramid solution is adjusted and the diameters of the through-holes of the functional resin layer are changed.

Example 7

By the desk-top coater, the polyethylene microporous membrane is coated with the solution obtained by dissolving polyvinylidene fluoride into N-methyl-pyrrolidone. The membrane is dipped into the water bath and phase-separated, and thereafter, dried by the hot air, thereby forming a functional resin layer which is made of polyvinylidene fluoride and whose area density is equal to 0.20 mg/cm$^2$ and manufacturing a separator of Example 7.

Example 8

A separator of Example 8 is manufactured in a manner similar to Example 7 except a point that the concentration of the polyvinylidene fluoride in the polyvinylidene fluoride solution is adjusted and the diameters of the through-holes of the functional resin layer are changed.

Example 9

A separator of Example 9 is manufactured in a manner similar to Example 7 except a point that the concentration of the polyvinylidene fluoride in the polyvinylidene fluoride solution is adjusted and the diameters of the through-holes of the functional resin layer are is changed.

Example 10

A separator of Example 10 is manufactured in a manner similar to Example 7 except a point that the concentration of the polyvinylidene fluoride in the polyvinylidene fluoride solution is adjusted and the diameters of the through-holes of the functional resin layer are changed.

Example 11

A separator of Example 11 is manufactured in a manner similar to Example 7 except a point that the concentration of the polyvinylidene fluoride in the polyvinylidene fluoride solution is adjusted and the diameters of the through-holes of the functional resin layer are changed.

Example 12

A separator of Example 12 is manufactured in a manner similar to Example 7 except a point that the concentration of the polyvinylidene fluoride in the polyvinylidene fluoride solution is adjusted and the diameters of the through-holes of the functional resin layer are changed.

Example 13

A separator of Example 13 is manufactured in a manner similar to Example 7 except a point that the thicknesses of the base material layer and the functional resin layer is changed.

<Comparison 1>

A separator of Comparison 1 is manufactured in a manner similar to Example 1 except a point that the concentration of the aramid resin in the aramid solution is adjusted and the diameters of the through-holes of the functional resin layer are changed.

<Comparison 2>

A separator of Comparison 2 is manufactured in a manner similar to Example 1 except a point that the concentration of the aramid resin in the aramid solution is adjusted and the diameters of the through-holes of the functional resin layer are changed.

<Comparison 3>

A separator of Comparison 3 is manufactured in a manner similar to Example 1 except a point that the concentration of the aramid resin in the aramid solution is adjusted and the diameters of the through-holes of the functional resin layer are changed.

<Comparison 4>

A separator of Comparison 4 is manufactured in a manner similar to Example 1 except a point that the concentration of the aramid resin in the aramid solution is adjusted and the diameters of the through-holes of the functional resin layer are changed.

<Comparison 5>

A separator of Comparison 5 is manufactured in a manner similar to Example 1 except a point that the concentration of the aramid resin in the aramid solution is adjusted and the diameters of the through-holes of the functional resin layer are changed.

<Comparison 6>

A separator of Comparison 6 is manufactured in a manner similar to Example 1 except a point that the concentration of the aramid resin in the aramid solution is adjusted and the diameters of the through-holes of the functional resin layer are changed.

<Comparison 7>

A separator of Comparison 7 is manufactured in a manner similar to Example 1 except a point that the concentration of the aramid resin in the aramid solution is adjusted and the diameters of the through-holes of the functional resin layer are changed.

<Comparison 8>

A separator of Comparison 8 is manufactured in a manner similar to Example 7 except a point that the concentration of the polyvinylidene fluoride in the polyvinylidene fluoride solution is adjusted and the diameters of the through-holes are changed.

<Comparison 9>

A separator of Comparison 9 is manufactured in a manner similar to Example 7 except a point that the concentration of the polyvinylidene fluoride in the polyvinylidene fluoride solution is adjusted and the diameters of the through-holes are changed.

<Comparison 10>

A separator of Comparison 10 is manufactured in a manner similar to Example 1 except a point that the concentration of the aramide resin in the aramide solution is adjusted and the diameters of the through-holes are changed.

<Comparison 11>

A separator of Comparison 11 is manufactured in a manner similar to Example 7 except a point that the concentration of the polyvinylidene fluoride in the polyvinylidene fluoride solution is adjusted and the diameters of the through-holes are changed.

With respect to each of the manufactured separators, the diameter of the through-hole and the area heat contraction ratio are measured as will be described hereinbelow. Batteries are manufactured by using the manufactured separators, the capacitance maintaining ratio at the 100th cycle is measured, and further, the presence or absence of lithium precipitation is confirmed.

(Measurement of Diameters of the Through-Holes)

With respect to each of the manufactured separators, the diameters of the through-holes of the functional resin layer is measured. The diameters of the through-holes of the functional resin layer are measured by using LEP-200-A (Liquid Extrusion Porosimeter method) manufactured by Seika Corporation and Perm-Porometer (the bubble point method and the half-drying method) manufactured by Seika Corporation.

(Measurement of Diameter of Narrowest Portion of Through-Holes)

Each of the manufactured separators is separated every layer, each of the polyethylene microporous membrane and the functional resin layer is measured by using Perm-Porometer manufactured by Seika Corporation and Liquid Extrusion Porosimeter (LEP-200-A) manufactured by Seika Corporation, and the diameter of the narrowest portion of the through-holes of the functional resin layer and the diameter of the narrowest portion of the through-holes of the polyethylene microporous membrane are obtained.

(Measurement of Area Heat Contraction Ratio)

The separator is cut out into parts of the longitudinal direction MD×the width direction TD=5 cm×5 cm and two points are marked along their centers so as to keep an interval of 4 cm. Subsequently, the separator which has been set onto a teflon plate in a rest state without being fixed is dipped into a thermostat tank which has previously been heated to 200° C. After 20 minutes, the separator is taken out, the intervals between the points which have previously been marked in each of the MD and TD are measured by calipers, and the area heat contraction ratio is measured by the following calculating equation.

(Equation)

Area heat contraction ratio (%)=100−{[("interval between 2 points of MD after heat treatment"×"interval between 2 points of TD after heat treatment")/("interval between 2 points of MD before heat treatment (4 cm)"×"interval between 2 points of TD before heat treatment (4 cm)")]×100}

[Measurement of Capacitance Maintaining Ratio, Confirmation of Presence or Absence of Precipitation of Lithium]

(Measurement of Capacitance Maintaining Ratio)

A coin type battery of a 2016 size is manufactured by using the manufactured separator as will be described hereinbelow. With respect to each of the manufactured batteries, the capacitance maintaining ratio is measured.

First, lithium cobalt acid, carbon black, and polyvinylidene fluoride are sufficiently dispersed into N-methyl-2-pyrrolidone at a weight ratio of 85:5:10, thereby forming a cathode mixture slurry.

Subsequently, the cathode collector is coated with the cathode mixture slurry, the slurry is dried, N-methyl-2-pyrrolidone is evaporated, and thereafter, the slurry is compression-molded at a predetermined pressure, thereby manufacturing the belt-shaped cathode.

Graphite and polyvinylidene fluoride are sufficiently dispersed into N-methyl-2-pyrrolidone at a weight ratio of 90:10, thereby forming an anode mixture slurry.

Subsequently, the anode collector is coated with the anode mixture slurry, the slurry is dried, N-methyl-2-pyrrolidone is evaporated, and thereafter, the slurry is compression-molded at a predetermined pressure, thereby manufacturing the belt-shaped anode.

Subsequently, the belt-shaped cathode and anode manufactured as mentioned above are punched in a disk shape. The cathode, anode, and separator are laminated in order of the cathode, separator, and anode and enclosed into the battery can.

Subsequently, the electrolytic solution in which $LiPF_6$ has been dissolved at a ratio of 1.0 mol/kg into the mixed solvent obtained by mixing ethylene carbonate and propylene carbonate at a volume ratio of 4:6 is injected into the battery can. After that, the battery can is caulked through an insulation gasket. In this manner, the battery of the 2016 size is obtained.

The manufactured battery is charged so that the open circuit voltage in the full charging state is equal to 4.2V. After that, the battery is discharged until the voltage reaches 3.0V at a constant current of 0.2C and the capacitance is measured. The capacitance maintaining ratio is calculated from the discharge capacitance at the 100th cycle and the discharge capacitance at the first cycle by the following equation.

"Capacitance maintaining ratio at the 100th cycle"(%)
={(discharge capacitance at the 100th cycle)/(discharge capacitance at the 1st cycle)}×100(%)

(Confirmation of Presence or Absence of Lithium Precipitation)

The battery after completion of 100 cycles is disassembled and the presence or absence of the lithium which is precipitated to the electrode is confirmed by the eyes.

Measurement results are shown in Table 1.

TABLE 1

| | BASE MATERIAL LAYER | FUNCTIONAL RESIN LAYER | AREA DENSITY OF FUNCTIONAL RESIN LAYER [mg/cm$^2$] | DIAMETER OF NARROWEST PORTION OF THROUGH-HOLE | | RATIO [%] OF THROUGH-HOLE DIAMETER (r) | | |
|---|---|---|---|---|---|---|---|---|
| | | | | BASE MATERIAL LAYER | FUNCTIONAL RESIN LAYER | 15 nm ≦ r < 20 nm | 20 nm ≦ r ≦ 10 μm | 10 μm < r ≦ 20 μm |
| EXAMPLE 1 | PE | ARAMID | 0.2 | 17.8 nm | 30.2 nm | 0 | 100 | 0 |
| EXAMPLE 2 | PE | ARAMID | 0.2 | 17.8 nm | 19.6 nm | 30 | 70 | 0 |
| EXAMPLE 3 | PE | ARAMID | 0.2 | 17.8 nm | 26.0 nm | 0 | 70 | 30 |
| EXAMPLE 4 | PE | ARAMID | 0.2 | 17.8 nm | 18.8 nm | 50 | 50 | 0 |
| EXAMPLE 5 | PE | ARAMID | 0.2 | 17.8 nm | 24.1 nm | 0 | 50 | 50 |
| EXAMPLE 6 | PE | ARAMID | 0.2 | 17.8 nm | 19.8 nm | 20 | 60 | 20 |
| EXAMPLE 7 | PE | PVdF | 0.2 | 17.8 nm | 32.9 nm | 0 | 100 | 0 |
| EXAMPLE 8 | PE | PVdF | 0.2 | 17.8 nm | 19.3 nm | 30 | 70 | 0 |
| EXAMPLE 9 | PE | PVdF | 0.2 | 17.8 nm | 20.7 nm | 0 | 70 | 30 |
| EXAMPLE 10 | PE | PVdF | 0.2 | 17.8 nm | 19.4 nm | 50 | 50 | 0 |
| EXAMPLE 11 | PE | PVdF | 0.2 | 17.8 nm | 24.7 nm | 0 | 50 | 50 |
| EXAMPLE 12 | PE | PVdF | 0.2 | 17.8 nm | 19.7 nm | 20 | 60 | 20 |
| EXAMPLE 13 | PE | PVdF | 0.2 | 21.6 nm | 32.3 nm | 0 | 100 | 0 |

TABLE 1-continued

| | | | | | | | | |
|---|---|---|---|---|---|---|---|---|
| COMPARISON 1 | PE | ARAMID | 0.2 | 17.8 nm | 15.2 nm | 100 | 0 | 0 |
| COMPARISON 2 | PE | ARAMID | 0.2 | 17.8 nm | 13 μm | 0 | 0 | 100 |
| COMPARISON 3 | PE | ARAMID | 0.2 | 17.8 nm | 42.3 nm | 0 | 40 | 60 |
| COMPARISON 4 | PE | ARAMID | 0.2 | 17.8 nm | 16.9 nm | 60 | 40 | 0 |
| COMPARISON 5 | PE | ARAMID | 0.2 | 17.8 nm | 34.6 nm | 0 | 10 | 90 |
| COMPARISON 6 | PE | ARAMID | 0.2 | 17.8 nm | 15.8 nm | 90 | 10 | 0 |
| COMPARISON 7 | PE | ARAMID | 0.2 | 17.8 nm | 16.9 nm | 40 | 20 | 40 |
| COMPARISON 8 | PE | PVdF | 0.2 | 17.8 nm | 15.0 nm | 100 | 0 | 0 |
| COMPARISON 9 | PE | PVdF | 0.2 | 17.8 nm | 11 μm | 0 | 0 | 100 |
| COMPARISON 10 | PE | PVdF | 0.2 | 17.8 nm | 28.9 nm | 0 | 70 | 0 |
| COMPARISON 11 | PE | PVdF | 0.2 | 17.8 nm | 24.3 nm | 0 | 70 | 0 |

| | CAPACITANCE MAINTAINING RATIO AT 100TH CYCLE [%] | AREA HEAT CONTRACTION RATIO [%] | LITHIUM PRECIPITATION |
|---|---|---|---|
| EXAMPLE 1 | 96 | 18 | NONE |
| EXAMPLE 2 | 92 | 16 | NONE |
| EXAMPLE 3 | 87 | 24 | NONE |
| EXAMPLE 4 | 78 | 19 | NONE |
| EXAMPLE 5 | 73 | 23 | NONE |
| EXAMPLE 6 | 91 | 19 | NONE |
| EXAMPLE 7 | 90 | | NONE |
| EXAMPLE 8 | 85 | | NONE |
| EXAMPLE 9 | 82 | | NONE |
| EXAMPLE 10 | 73 | | NONE |
| EXAMPLE 11 | 72 | | NONE |
| EXAMPLE 12 | 87 | | NONE |
| EXAMPLE 13 | 88 | | NONE |
| COMPARISON 1 | 4 | 9 | NONE |
| COMPARISON 2 | PEEL-OFF OF COATING SURFACE | 80 | UNABLE TO MEASURE |
| COMPARISON 3 | 46 | 75 | MUCH |
| COMPARISON 4 | 50 | 39 | NONE |
| COMPARISON 5 | 36 | 78 | MUCH |
| COMPARISON 6 | 32 | 62 | LITTLE |
| COMPARISON 7 | 48 | 52 | MIDDLE |
| COMPARISON 8 | 7 | | NONE |
| COMPARISON 9 | PEEL-OFF OF COATING SURFACE | | UNABLE TO MEASURE |
| COMPARISON 10 | 37 | | MIDDLE |
| COMPARISON 11 | 42 | | MIDDLE |

PE: POLYETHYLENE
PVdF: POLYVINYLIDENE FLUORIDE

As shown in Table 1, in Examples 1 to 6 in which the aramid resin is used as a resin forming the functional resin layer, in the case of measuring by the Liquid Extrusion Porosimeter method, bubble point method, and half-drying method, all of the diameters of the through-holes of the functional resin layers which are obtained in the case of measuring by the Liquid Extrusion Porosimeter method, bubble point method, and half-drying method lie within the range from 0.015 μm or more to 20 μm or less and the number of through-holes (of the functional resin layers) whose diameters lie within the range from 0.02 μm or more to 10 μm or less is equal to 50% or more in the whole number of through-holes. Therefore, the capacitance maintaining ratio at the 100th cycle is good and the area heat contraction ratio is small.

In Examples 7 to 12 in which polyvinylidene fluoride is used as a resin forming the functional resin layer, in the case of measuring by the Liquid Extrusion Porosimeter method, bubble point method, and half-drying method, all of the diameters of the through-holes of the functional resin layers which are obtained in the case of measuring by the Liquid Extrusion Porosimeter method, bubble point method, and half-drying method lie within the range from 0.015 μm or more to 20 μm or less and the number of through-holes (of the functional resin layers) whose diameters lie within the range from 0.02 μm or more to 10 μm or less is equal to 50% or more in the whole number of through-holes. Therefore, the capacitance maintaining ratio at the 100th cycle is good.

In Comparison 1, since all of the diameters of the through-holes of the functional resin layers lie within the range smaller than the optimum range (from 0.02 μm or more to 10 μm or less), the cycle characteristics deteriorate remarkably.

In Comparison 2, since all of the diameters of the through-holes of the functional resin layers lie within the range larger than the optimum range (from 0.02 μm or more to 10 μm or less), the hole diameters are large, a strength of the coating film is weak, and a peel-off phenomenon appears upon assembling of the battery.

In Comparison 3, since the diameters of the through-holes of the functional resin layers are shifted to the range larger than the optimum range (from 0.02 μm or more to 10 μm or less) and the ratio of through-holes (of the functional resin layers) whose diameters lie within the optimum range is smaller than 50%, although the cycle characteristics are relatively good, the area heat contraction ratio is large.

In Comparison 4, since the diameters of the through-holes of the functional resin layers are shifted to the range smaller than the optimum range (from 0.02 μm or more to 10 μm or less) and the ratio of through-holes (of the functional resin layers) whose diameters lie within the optimum range is smaller than 50%, the cycle characteristics are low.

In Comparison 5, since the diameters of the through-holes of the functional resin layers are largely shifted to the range larger than the optimum range (from 0.02 μm or more to 10 μm or less) and the ratio of through-holes (of the functional resin layers) whose diameters lie within the optimum range is fairly smaller than 50%, the cycle characteristics are low and the precipitation of the lithium metal onto the electrode occurs.

In Comparison 6, since the diameters of the through-holes of the functional resin layers are largely shifted to the range smaller than the optimum range (from 0.02 μm or more to 10 μm or less) and the ratio of through-holes (of the functional resin layers) whose diameters lie within the optimum range is fairly smaller than 50%, such a result that the cycle characteristics are extremely low is obtained.

In Comparison 7, since the ratio of through-holes (of the functional resin layers) whose diameters lie within the optimum range (from 0.02 μm or more to 10 μm or less) is fairly smaller than 50%, the cycle characteristics are low and the precipitation of the lithium metal onto the electrode occurs.

In Comparison 8, since all of the diameters of the through-holes of the functional resin layers lie within a range smaller than the optimum range (from 0.02 μm or more to 10 μm or less), the cycle characteristics deteriorate remarkably.

In Comparison 9, since all of the diameters of the through-holes of the functional resin layers lie within a range larger than the optimum range (from 0.02 μm or more to 10 μm or less), the hole diameters are large, the strength of the coating film is weak, and the peel-off phenomenon appears upon assembling of the battery.

The present application is not limited to the foregoing embodiments of the present application but many modifications and applications are possible within the scope of the present application without departing from the essence of the present application. Although the embodiments have been described above with respect to the lithium ion secondary battery as an example, the present application can be also applied to, for example, a nickel-hydrogen battery, a nickel-cadmium battery, a lithium-manganese dioxide battery, a lithium-iron sulfide battery, or the like.

Although the embodiments and Examples have been described above with respect to what is called a lithium ion secondary battery in which the capacitance of the anode is expressed by the capacitance component due to the doping and dedoping of lithium, the present application can be also applied to what is called a lithium metal secondary battery in which the lithium metal is used as an anode active material and the capacitance of the anode is expressed by the capacitance component due to the precipitation and dissolution of lithium or a secondary battery constructed in such a manner that by setting a charge capacitance of the anode material which can dope and dedope lithium to be smaller than a charge capacitance of the cathode, the capacitance of the anode includes the capacitance component due to the doping and dedoping of lithium and the capacitance component due to the precipitation and dissolution of lithium and is expressed by the sum of them.

Further, although the embodiments have been described above with respect to the non-aqueous electrolyte secondary battery having the winded structure, the present application can be also applied to a battery having a structure in which, for example, the cathode and the anode are folded or piled. Further, the shape of the battery is not limited and the present application can be also applied to a rectangular battery or the like. Moreover, the present application is not limited to the secondary battery but can be also applied to a primary battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A separator comprising:
a base material layer made of a polyolefin resin including a plurality of through-holes; and
a functional resin layer which is made of a resin different from said polyolefin resin and includes a plurality of through-holes creating a porous interconnected structure in which through-holes of the base material layer are interconnected to the through-holes of the functional resin layer,
wherein a diameter of a narrowest portion of through-holes of said functional resin layer is larger than a diameter of a narrowest portion of through-holes of said base material layer, wherein all of the diameters of the through-holes of said functional resin layer range from 0.015 μm or more to 20 μm or less and the number of said through-holes of said functional resin layer whose diameters range from 0.02 μm or more to 10 μm or less is equal to 50% or more of the whole number of through-holes of said functional resin layer.

2. The separator according to claim 1, wherein said functional resin layer includes aramid.

3. The separator according to claim 1, wherein said functional resin layer contains at least a heat resistant resin.

4. The separator according to claim 1, wherein said functional resin layer contains at least a fluororesin.

5. The separator according to claim 1, wherein air permeability of said separator ranges from 30 sec/100 cc or more to 1000 sec/100 cc or less.

6. The separator according to claim 1, wherein a piercing strength of said separator range from 100 gf or more to 1000 gf or less.

7. A battery comprising a cathode, an anode, an electrolyte, and a separator,
wherein said separator has at least
a base material layer made of a microporous membrane of a polyolefin resin including a plurality of through-holes, and
a functional resin layer which is made of a resin different from said polyolefin resin and includes a plurality of through-holes creating an interconnected structure in which through-holes of the base material layer are interconnected to the through-holes of the functional resin layer, and
a diameter of a narrowest portion of through-holes of said functional resin layer is larger than a diameter of a narrowest portion of through-holes of said base material layer, wherein all of the diameters of the through-holes of said functional resin layer range from 0.015 μm or more to 20 μm or less and the number of said through-holes of said functional resin layer whose diameters range from 0.02 μm or more to 10 μm or less is equal to 50% or more of the whole number of through-holes of said functional resin layer.

8. The battery according to claim 7, wherein an open circuit voltage in a full charging state lies within a range from 4.2V or more to 4.6V or less.

* * * * *